United States Patent [19]

Rapp et al.

[11] 4,199,814
[45] Apr. 22, 1980

[54] COMPUTER NUMERICAL CONTROL MACHINE TOOL

[75] Inventors: Edward J. Rapp, Cleveland Heights; Glen A. Johnson, Cleveland, both of Ohio

[73] Assignee: Digitcom, Inc., Mentor, Ohio

[21] Appl. No.: 841,597

[22] Filed: Oct. 12, 1977

[51] Int. Cl.² .................... G06F 15/46; G05B 19/18
[52] U.S. Cl. .................... 364/474; 318/568; 318/573; 318/574; 364/107; 364/120; 364/900
[58] Field of Search .............. 364/474, 475, 107, 114, 364/115, 120, 200 MS File, 900 MS File; 318/568, 569, 570, 572, 573, 571, 574, 685, 696

[56] References Cited

U.S. PATENT DOCUMENTS

| 3,744,031 | 7/1973 | Avery et al. ...................... 364/200 |
| 3,783,253 | 1/1974 | Anderson et al. ............... 318/570 X |
| 3,970,830 | 7/1976 | White et al. ..................... 364/474 X |
| 4,060,851 | 11/1977 | Nakatsukasa et al. .......... 364/107 X |
| 4,074,349 | 2/1978 | Ueda ................................ 364/474 X |
| 4,074,350 | 2/1978 | Roch et al. ..................... 364/474 X |
| 4,079,235 | 3/1978 | Froyd et al. ..................... 364/474 X |

OTHER PUBLICATIONS

"Numeripath CNC 800 Control Systems"—Giddings & Lewis Electronics Co., pp. 1-8, 1976.

*Primary Examiner*—Joseph F. Ruggiero
*Attorney, Agent, or Firm*—Fay & Sharpe

[57] ABSTRACT

This invention relates to a computer numerical control (CNC) machine tool system having a novel terminal controller and system therefor to control a machine tool generally with at least two axes and more probably three, with stepping motor controls for point-to-point positioning of the machine tool to an almost infinite variety of steps (generally not more than 200). The novelty resides in the ease of programming directly on the terminal controller of the CNC machine tool system. Generally at least some editing and offsets will be programmed from the machine tool.

The terminal controller consists of a microprocessor with some RAM and ROM, together with address and data bus plus I/O for magnetic tape handling and display for 6 to 8 digits in each of the X and Y positions, together with numeric keyboard for data input to the program steps and functional keys to control operation-automatic, manual and step-by-step, as well as controls for program input from tape to memory and memory to tape.

Particular features include the ease of inputting a program and preparing a tape and then editing the tape while in operation. Further features include circular and linear interpolation. For circular interpolation there are no quadrant limitations and a full or partial circle may be cut.

8 Claims, 14 Drawing Figures

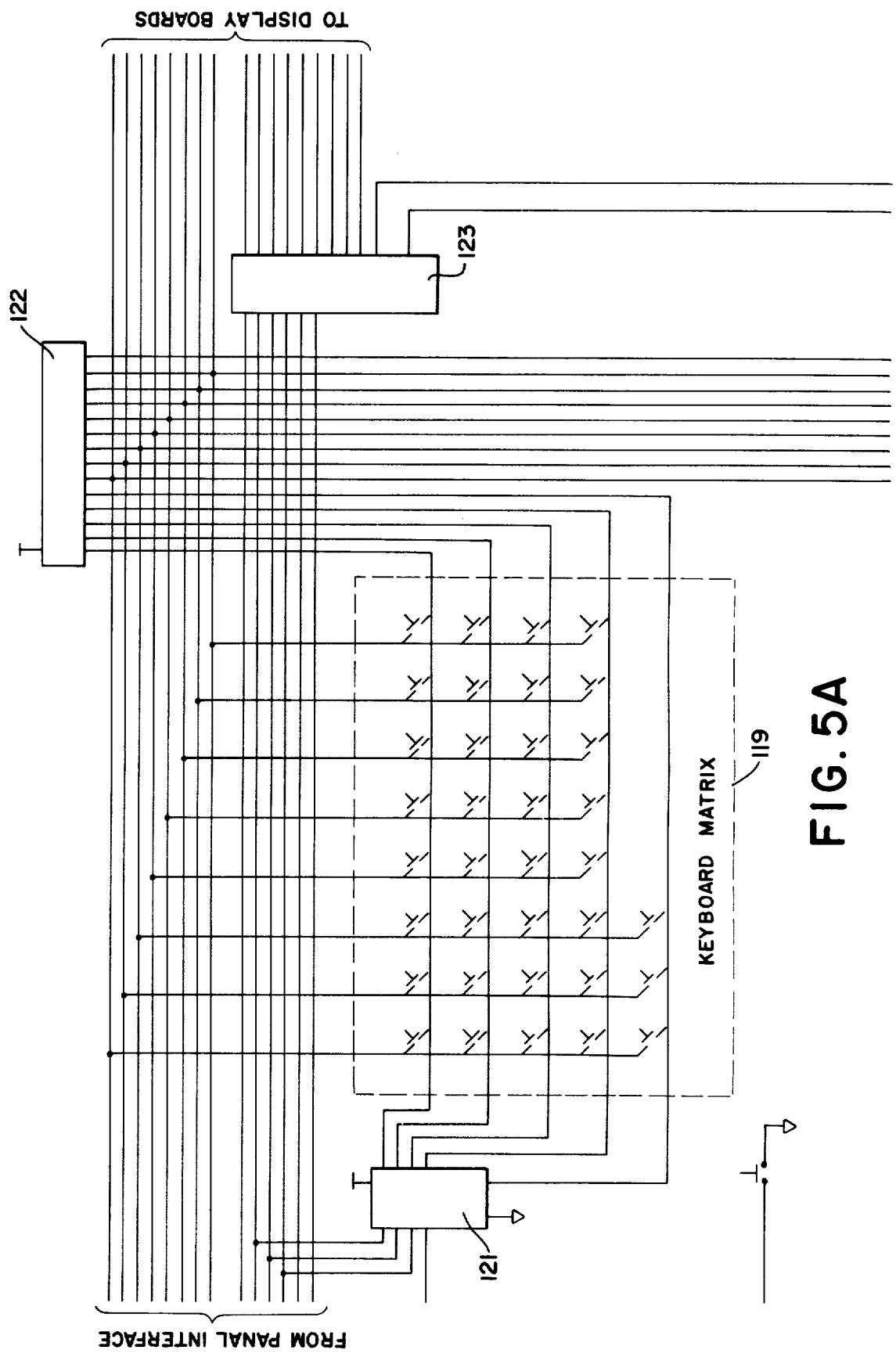

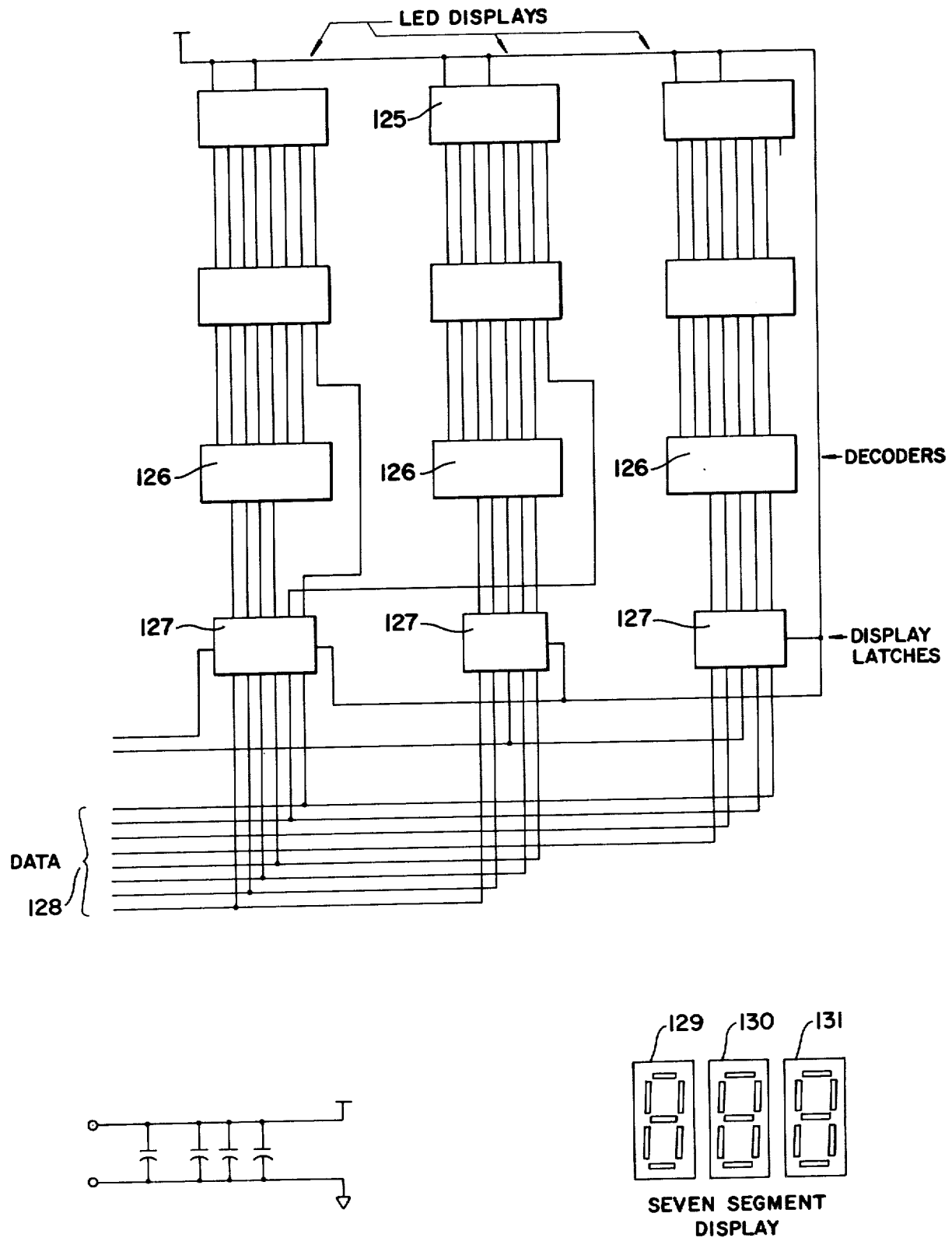

COMPUTER NUMERICAL CONTROL MACHINE TOOL

BACKGROUND OF THE INVENTION

Numerical control is more than twenty years old. It started with some of the early developments by John T. Parsons, at M.I.T., at Bendix and other places, namely in U.S. Pat. Nos. 2,537,427; 3,069,608; 3,226,667 and 3,508,251. The early machines were numerical contouring control machines, such as U.S. Pat. No. 3,226,649 or numercial positioning control (i.e. point-to-point), such as U.S. Pat. Nos. 3,248,622 or 3,291,970.

Later CNC was developed both automatically and manually, i.e. with an override, e.g., U.S. Pat. Nos. 3,828,318, 3,816,723 and 3,854,353. The first of these could be programmed by the machine tool operator without use of codes working directly from the parts drawing.

Thus we can see that the NC and CNC systems have come a complete circle. Starting with magnetic taping of a "dry run" which was then repeated, they have gone to elaborate post-processors which prepared the tape. Now more functions are incorporated into a control system itself which was a minicomputer and is now a microprocessor with all of the functions being done on the machine, although a simulated microprocessor may be used for tape generation. Contouring requires more complex computer tapes but this machine is for point-to-point positioning which can be generated on the machine.

One intermediate step in this development for small shops with short part runs was in the development of machinist programmed CNC with the requirement that these were programmed with thumb wheels which is a known technique for conversion of units from English to digital units. This system is a Manual Data Input (MDI) control system and allows 96 X-Y positions with thumb-wheeled dialing of the dimensional coordinates into memory. Examples would be the Anilam machine, Anilam Electronics Corporation, Miami, Fla. This allows editing or changes to be made prior to machining the first part. Another type is shown in U.S. Pat. No. 3,828,318.

Actually these machines do have some or all of the following features, e.g. 100 memory positions for X and Y coordinates, machine controlled parts programming and editing on the machine via thumb wheels, digital read-out to monitor and display of machine location. Operation can be automatic, semiautomatic and manual, allowing for offsets. Single steps in memory can be changed.

Another development that has taken place is exemplified in U.S. Pat. No. 3,854,353 where the controller has a mass memory having at least two parts, one of which is a random access memory from which machine instructions and tool displacement path data are stored. In addition, there is an arithmetic and memory unit. Thus tool displacement, path definition and machine functions from the punched tape are stored in memory and when these instructions are complete, control is returned to the tape.

Another development was DNC, i.e., direct numerical control. This was developed in 1970 but fell short of the mark because the large computer available in 1965 to 1970 could not supply the data pulses at the rate required for three-axis simultaneous contouring controls. Frequently their computing power was too slow to calculate and control the milling heads to interpolate either linearly, circularly, or parabolically in the time required, i.e. microseconds.

The trend is toward further miniaturization of the individual control in a microprocessor controlled CNC. The advantage is that the user is not required to program the N/C; rather the computational software is stored in PROM (Programmable read-only memory).

The drives for N/C machine tools were possible because of high accuracy of recirculating ball feed screws and the use of silicon controlled rectifier (SCR), servo drives or stepping motor. This invention uses the latter system.

Another measuring system used is precision glass scales which eliminates reliance on lead screws for positioning accuracy.

In the 1970's, the advance shifted to computer numerical control (CNC in which a self-contained N/C system for each machine includes a dedicated computer processor using stored instruction inputted usually by punched tape to perform some or all of the basic numerical functions. Another system was DNC, i.e. direct numerical control which refers to a system of multiple machine tools directly controlled by a central computer. See IEEE Spectrum, March 1977, p. 81–83. In these N/C systems, 90 percent of the trouble occurred in the paper or Mylar tape reader. This invention avoids this problem completely by using magnetic tape for input and storage.

With the trend from N/C to CNC the system changed from hardware to software systems bringing flexibility reduction in hardware and simpler diagnostics. Concomitant with this development was a reduction in the inaccuracies in manufacture, some of which had been brought on by paper or Mylar tape readers generally used in N/C systems. These data programs were generally prepared off-line with special programmers and equipment and they necessitated remaking the program for errors or other reasons. Offsets were also limited.

Computer numerical control allowed improvement in means for correcting errors and possibility of debugging the edited part-data tape. Here the program is placed from the tape reader into core memory (store) where it is read many times. Editing can be done to correct mistakes in cutting speed, cutting tool off size, etc. Some of these CNCs would then cut a new tape after the production run had been made.

Many of these CNC systems had cathode ray tube display for instructions and plotting—all associated with the edit function. Aside from the cost, CNC system complexes are really not intended for on the machine programming by the machinist. This is particularly important in the small shop where runs are short and tapes are being changed often.

Another trouble with some of the early CNC systems was in the speed of the microprocessor which limited required speed for certain cutter compensation and circular interpolation computations. As a result, these had wired logic in these early models, i.e. G.E. Mark Century 1050.

SUMMARY OF THE INVENTION

Basically this invention is a CNC microprocessor controller for machine tools, particularly of the two and three-axis type, though not so limited in which the control tape is generated and fed into memory from which parts are run. The generation of a tape consists of programming a series of X and Y positions with appropriate feed rates and tool selections in which the microprocessor controller is programmed in English or metric units which are then converted to machine units by a software program and then stored in memory. To run a step, or the entire program, the machine units are reconverted to English or metric units and displayed on an LED display for both coordinates. Expressed another way, we might say that the assembly language is in the microprocessor memory.

More particularly this invention is a CNC for point-to-point positioning and programming of a machine tool. In at least one version, it is for a variety of milling machines of which the Bridgeport is an example, and these have at least two axes with a spindle quill for the third axis. This controller is physically adjacent and electrically connected to the machine tool and has programming within the memory of the controller to control the machine tool. The control or controller consists of an input terminal which has a keyboard with alphanumeric keys, plus a certain number of functional keys, and it shows or displays on an LED display the X and Y coordinates in at least six digits. The controller has a microprocessor with an arithmetic logic unit and its CPU with some RAM and ROM store and data and address handling needs. In the present version, substantial additional quantity of RAM and ROM are used in order to provide for the proper programming and to provide for a great number of sequence steps to be used in connection with the point-to-point positioning and control of the machine tool. Memory can be saved by putting it into a cassette tape with logic controls to input a computer program into the memory or store of the computer and to tape a program that has been either modified on the machine; that is, edited on the machine or generated on the machine. Basically, of course, as in all CNCs, the control which includes the functional keys caused the stored program to direct and control the machine tool with the other control means for inputting into store machine language instructions directly on the terminal, thereby modifying a stored program or building one. The advantage of this system is that we are able to get an infinite variety of programs from a first program that are either generated off the control or on the control and that many offsets and machine tool wear problems can be handled by generating a new tape which can actuate the next time the entire system is started up.

Particular features that are important in this is that frequently a particular tool will be run through a series of positions and one operation will be conducted with that tool. We then have the same X and Y coordinates to go through a sequencing step and this routine or sub-routine as we will call it can be repeated quickly without programming each of the X Y coordinates for each of the subsequent steps.

A further feature of this invention is that the units are stored in steps; that is memory in machine language though they may be inputted either in English or metric units. The microprocessor converts the inputted dimension to machine language units which will then subsequently control the stepping motors to advance the table X and Y to the correct position for a machine tool operation. The advantage of this is that it does not require the operator to think in both units and allows him to check a print that may be in English units by putting on the print as he goes through the sequencing in the dry run the metric equivalent of the English units. The reverse of course is just as easy.

A further feature of this invention is that it allows for better linear and circular interpolation. For circular interpolation, we store the starting coordinates in X and Y data, the center coordinates in X and Y data and the end point coordinates in X and Y data, as well as the direction that we are going—either clockwise or counterclockwise. The control calculates the position of the circular interpolation over an infinite number of discrete points without regard to quadrants. That is, there is no quadrant limitation in this controller. It then calculates to locate where the tool is at each of these discrete points and has comparing means to compare the calculated position with the actual position, knowing that the machine tool works in a step-by-step function of a limited number of movements of X and a limited number of movements of Y, usually in $\pm 0.0005''$. In this way we guide the machine in a continuous path radius compensation.

The algorithm that we have used in connection with linear interpolation and circular interpolation is taught in J. P. Peatman, "A Design of Digital Systems", McGraw-Hill, 1972, page 362, et seq. In connection with both circular and linear interpolation, the particular advantage of this unit is that we are able to store the initial and final coordinates in memory, we are able to calculate a first position and send instructions in coordinate data for said position, we are able to calculate the first position as on the path desired and we are then able to recalculate the next instructions at least every 375 microseconds, making allowance for the prior position to bring back the interpolation to the path desired in a staircase movement, 0.0005" per step. We are able to repeat this process until the final coordinates are reached. The point of this is that the speed of the microprocessor is such that the coordinates of a linear and/or circular interpolation algorithm can be calculated and it can be compared with the position of the machine at the end of each individual step so that we can bring back the point on the desired path.

BRIEF DESCRIPTION OF THE DRAWINGS

FIG. 5A is the keyboard and keyboard card showing the push buttons for the CNC and keyboard matrix;

FIG. 6 shows a schematic of the position read out, that is, the LED displays;

DESCRIPTION OF THE PREFERRED EMBODIMENTS

Figure 11:
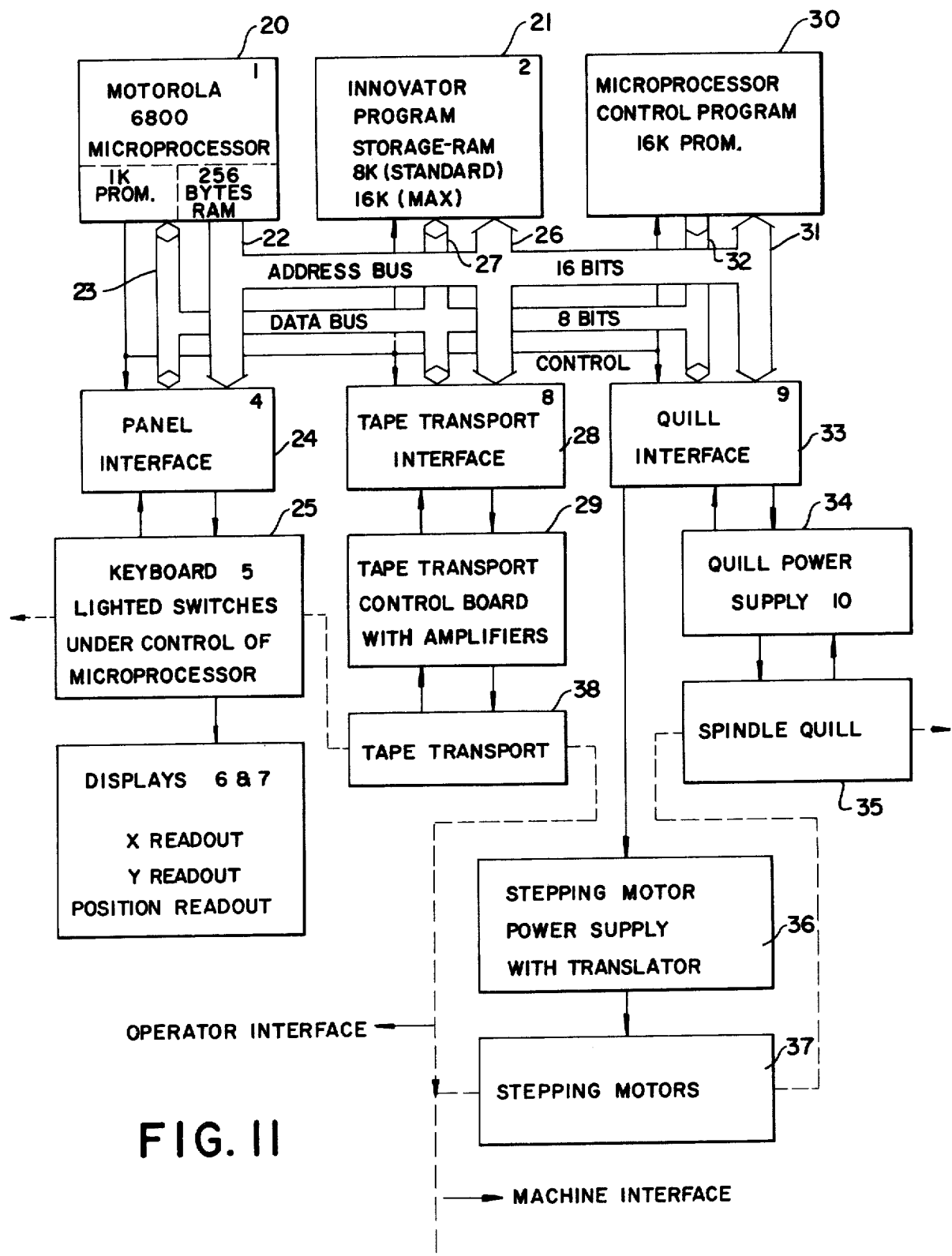
FIG. 11 is a schematic or block diagram of the entire CNC control.

Briefly speaking, this CNC control is based upon a Motorola 6800 microprocessor which is shown in box 20 in FIG. 11. This has 1K of PROM and 256 bytes of RAM on the processor board itself, as is shown on the diagram. This board does the basic sequencing for all the logic controls in the system. The processor generates a 16 byte address bus and accepts and gives data on its bidirectional data bus. There are also control lines which control direction and flow of the data. The RAM card controls the program storage for the control. The 200 sequence steps are stored on the RAM card. This is block 21 immediately adjacent to the right. This card is expandable up to 10K which will give the capacities of 999 sequence program steps. The PROM board actually is two printed circuit boards with 8K per board and makes up 16K total PROM storage for the microprocessor control program. Immediately below the microprocessor connected by the address and the data busses, which have been labeled 22 for the address bus and 23 for the data bus, is the panel interface designated 24. This communicates to the keyboard which has been designated 25. This is a data entry on the operator's interface and also to the display card which gives the X and Y coordinate read outs and the position read outs which is used for sequence number, tool number and feed rate.

Immediately beneath the RAM card 21 and connected by the address bus designated 26 and data bus designated 27 is a tape transport interface designated 28 which connects to the tape transport control board 29 that converts the data from the microprocessor into serial bit streams which are placed on the cassette. The tape transport control board powers the motors to the tape deck and also controls the amplifiers to the read and write amplifiers. Immediately to the right is the microprocessor control PROM designated 30 which is 16K PROM. It has its address bus connection designated 31 and its data bus connection designated 32 to the quill interface designated 33, which in turn is connected to the quill power supply designated 34 and to the spindle quill designated 35. The quill interface is connected to the stepping motors designated 36 and their power supplies of the stepping motors being 37. Dotted lines show the connection to the various components. The quill interfaces with the microprocessor and also with the power supplies which drive the spindle quill attached to a milling machine. The quill interface also interfaces to the stepping motor power supplies which also contain the translators and the stepping motors mounted on the X and Y beds of the milling machine. This control system is designated to convert the absolute dimensions from machine prints, English or metric, into steps controlling of a vertical milling machine of a number of types. The dimensions may be entered and modified by the keyboard and stored on cassette tapes for future use. The control consists of only three basic sections: a microprocessor base controller, a power control and stepping motor drives. The microprocessor base controller accepts all the instructions that are entered on the keyboard. The keyboard is used to enter the X and Y coordinates of the table, the desired spindle operations, the turret stop number (the tool number) and the feed rate for each program sequence. The program can then be recorded on a cassette tape for future use. The cassette tape can be used to re-enter the program into the memory storage. The stored information will control any vertical milling machine equipped with stepping motors, accomplishing the same steps as the machine operator, but with greater speed and accuracy. The control can be accurate to ±0.0005" and the stepping motors wil be controlled to 0.0005". The accuracy of the machine tool or toolwear must be added to the control to determine the total system accuracy.

Figure 12:
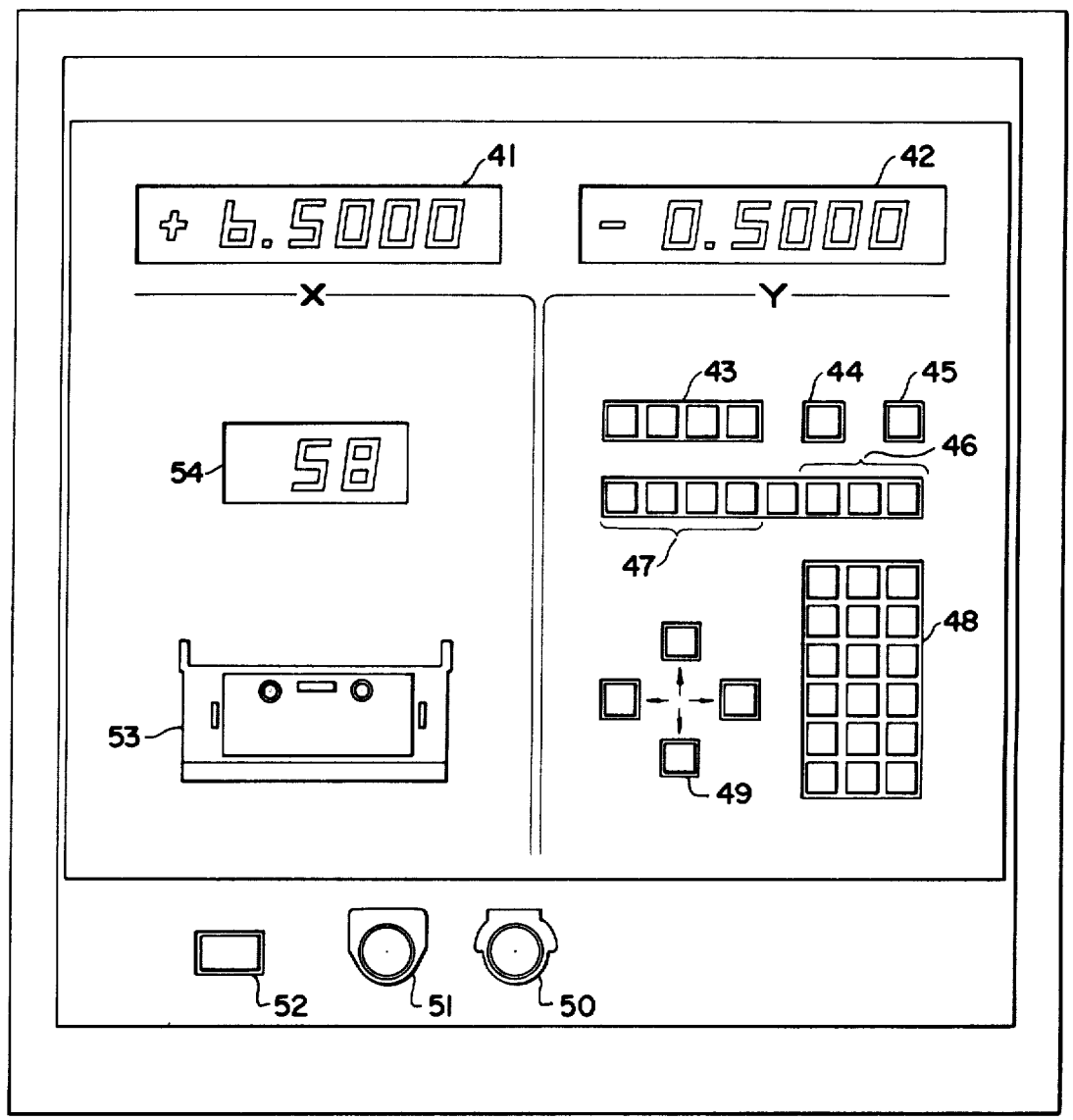
FIG. 12 is a front view of the control for the CNC.

FIG. 12 is a plan view of the control for said CNC. At 41 is shown the six-digit X access read out in inches or centimeters. The Y-axis read out in inches or centimeters is shown at 42. The mode selection switch may be either automatic, semi-automatic or pause and is shown at 43. The tool number is shown at 44. The button is pressed to insert the number or to display. At 45 is shown the metric mode button and 46 is the tape control button and it has either record, verify and playback positions. A series of function switches are shown at 47, such as the memory controls, system clear, list mode (display program memory), single step, program and reset modes. The numerical data keyboard is shown at 48 for the X, Y and Z-axis quill entry, together with functional switches marked CW and CCW which are clockwise and counterclockwise, feed rate and tool number entries. At 49 is the four-way jog switch, 50 is the emergency stop and 51 shows the main mill control indicating all circuits are off except the controller. At 52 is the "power on" switch and 53 is the cassette tape that programs the control memory bank from off-ine programmer and also for cassette memory storage for future runs. The three-digit read out for program review is shown at 54 and these positions are position number, tool number and feed rate.

Following is a more complete list of the functions of these program switches.

"RUN" used to run the stepping motors.

"AUTO" used to execute a program without pausing except when returned to home position or for a programmed pause. "SEMI AUTO" used to execute a program pausing at each location before executing the wizard operation.

"PAUSE" used to initiate the stepping motor movement or to stop the stepping motor movement. If table motion is stopped with the pause switch, it can be started again with the pause switch without introducing an error.

"PROG" when lit, indicates controller is in the programming mode.

"SING STEP" used to increment sequence number counter.

"LIST" used to examine the contents of the program memory.

"RESET" used to reset sequence number counter in program mode or list mode, and used to reset error condition. A reset in program mode indicates end of program.

"CW" used in programming circular information, indicates a clockwise direction about the center.

"CCW" used in programming circular information, indicates a counterclockwise direction about the center.

"FEED" used to enter feed rate in the program mode or display feed rate in the list mode.

"TOOL NO." used to enter Tool No. (turret stop number) in program mode or display Tool No. in list mode.

"METRIC" used to change between metric and English units (cm and inch). When lit, the controller is in the metric mode.

"SYS. CLR" used to clear the program memory, and return the control unit to the program mode.

"REC" used to record a program from the controller onto the cassette tape.

"VER" used to verify a program in the control unit with a program on a cassette tape. This can be used after programming the control unit from a tape to verify the control unit was programmed correctly, or after recording a cassette tape from the control unit to verify the cassette tape was recorded correctly.

"PLAY" used to program the control unit from a cassette tape.

"CLR" used to clear the entry being made before the enter switch is pushed.

"ENT" used to enter the information from the display to the program memory.

"SEQ" used in list mode to jump directly to a particular sequence number.

"JOG"—4 switches used in the run mode to manually position the table before entering the auto or semi-auto mode.

Figure 1A:
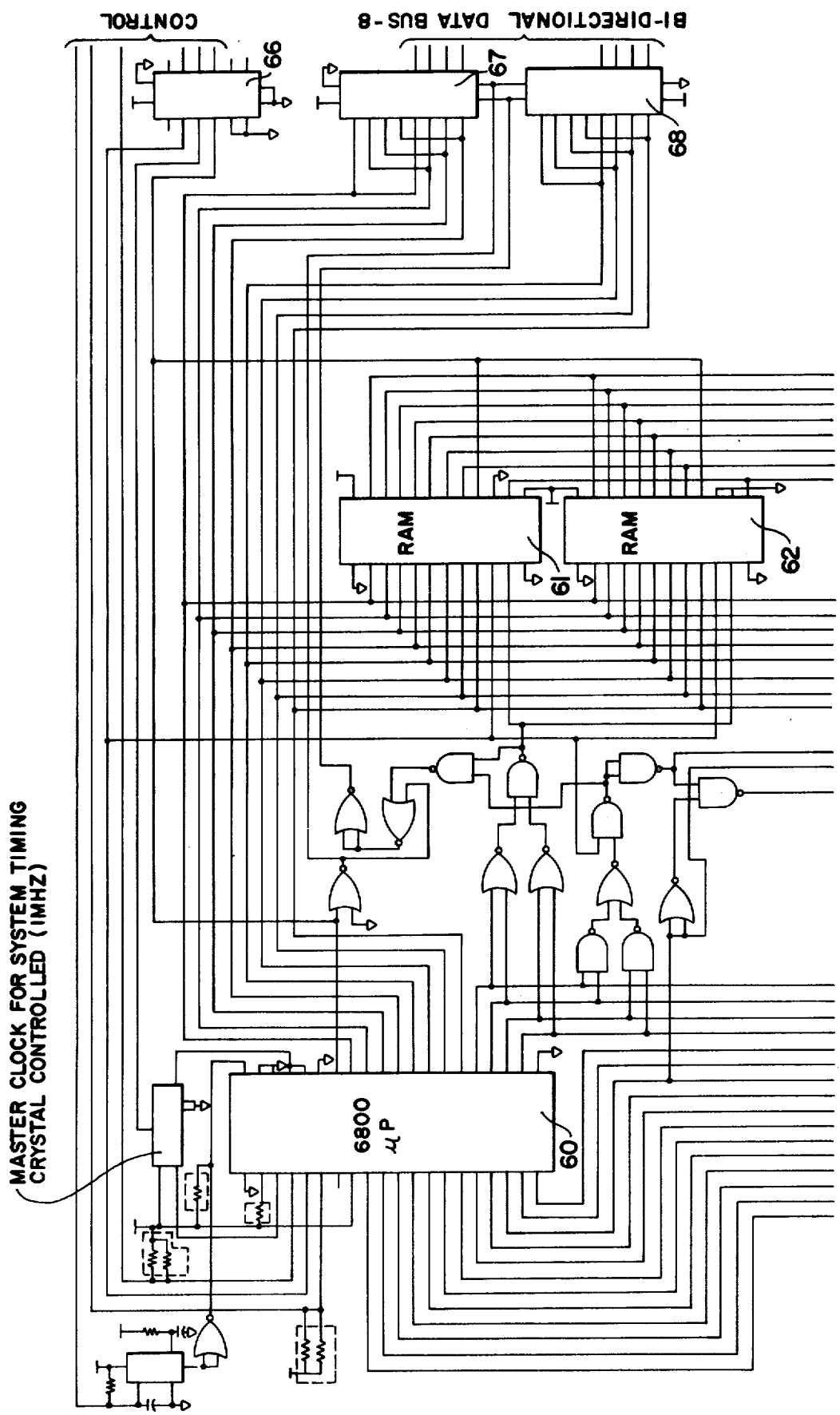
FIG. 1A is a schematic showing the microprocessor chip board and the RAM chips.
Figure 1B:
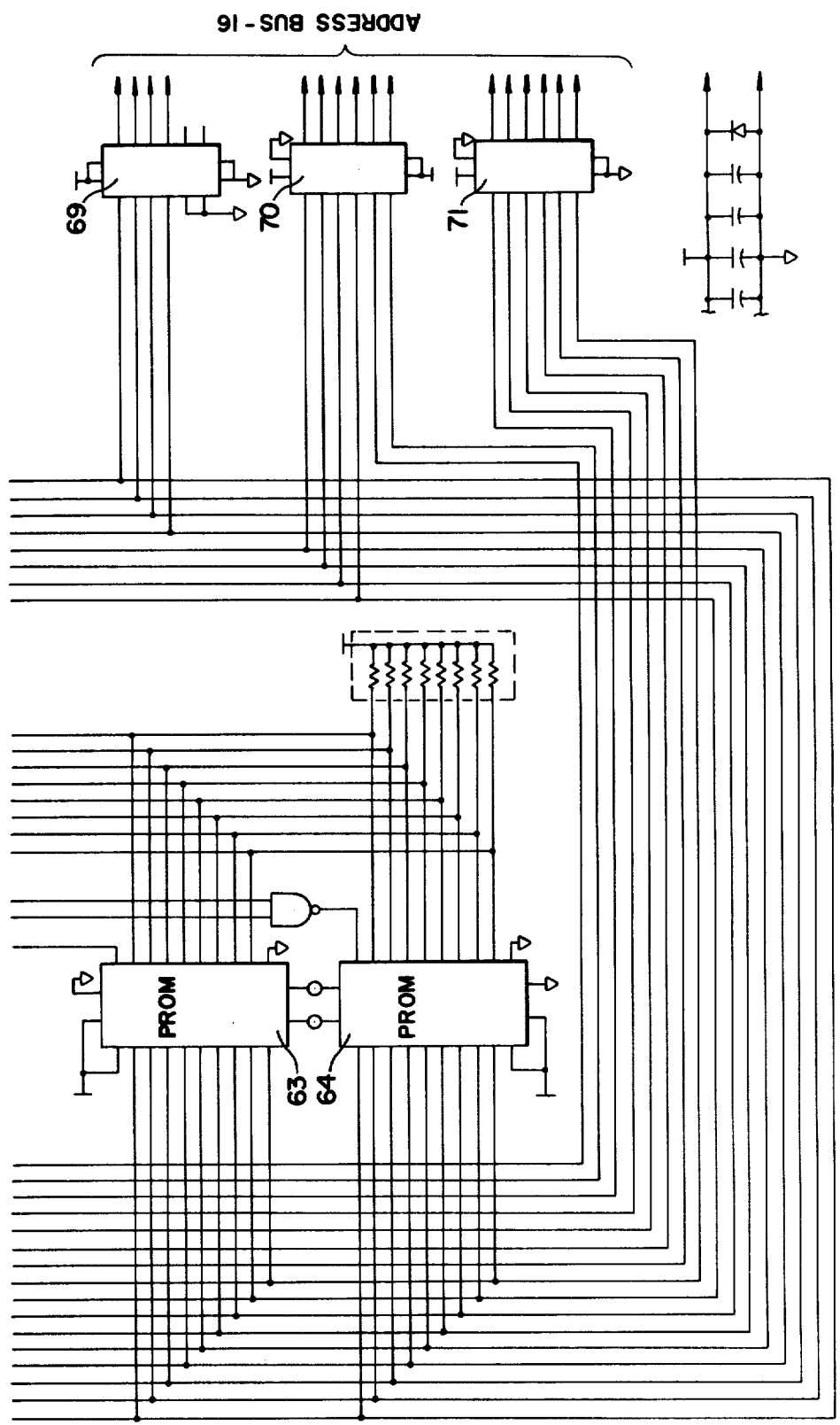
FIG. 1B is immediately below FIG. 1A and shows the PROM chips and the contacts to the address busses.

FIGS. 1A and 1B are a pair of figures, one immediately above the other, and they basically show the overall CPU card, that is, the microprocessor board. In the upper left-hand corner is the microprocessor itself, a Motorola 6800 processor designated 60, and this is connected through to a pair of RAM cards designated 61 and 62 which are connected through to a number of chips for control in the upper right-hand corner at 66 and the data bus bidirectional controls are controlled by chips 67 and 68. In FIG. 1B we have the PROM cards designated 63 and 64 which are connected through to the chips to control the address busses which are on the right-hand side and designated 69, 70 and 71. A diagram shows the connections for the 5-volt power supply connected through the ground.

It is to be understood, of course, that the basic instructions for programming the Motorola 6800 processor are well-known and explained in a series of manuals, one of which is the "Motorola M6800 Processor Manual". For a complete understanding it should be appreciated that in FIGS. 1A and 1B on the right-hand side of the drawing are the control lines which lead the cards which interface with other cards in the rack, i.e. the bidirectional data busses and the address bus. The address bus is output only going to other cards in the system. The bidirectional data bus is both input and output for the microprocessor and the other cards in the system.

Figure 2:
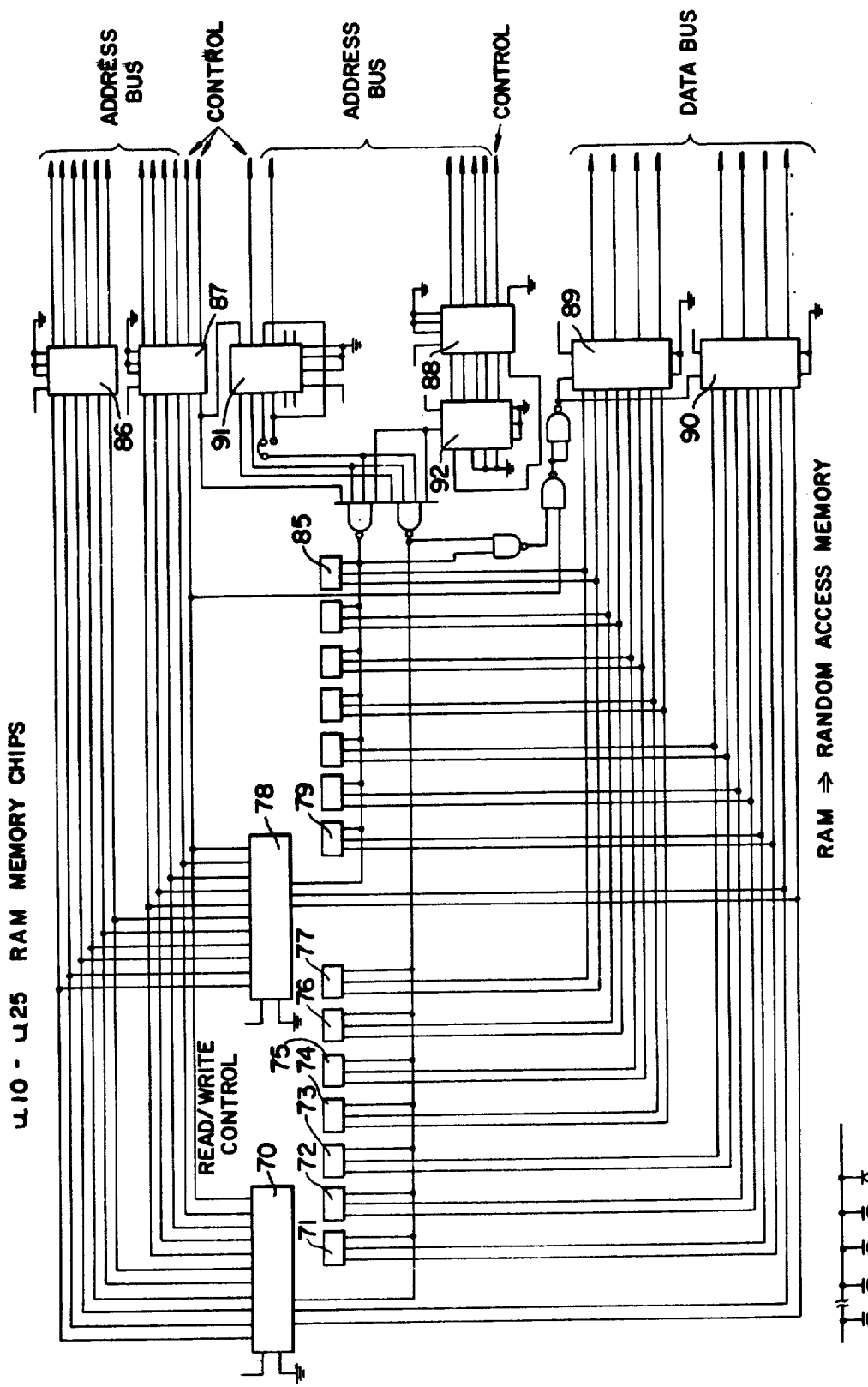
FIG. 2 is a schematic view of the RAM card.

FIG. 2 is a schematic of the RAM card. This has been designated here as numbers 70 through 85 and are marked on the drawing. This card has the capacity of storing up to 200 sequence steps. Each one of these is an identical memory chip. The address busses come in through chips 86 and 87, as well as 88. These are chips U-1, U-2 and U-4 on the right-hand side of the drawing. Likewise, the RAM card has a bidirectional data bus which is in the lower right-hand portion of the drawing designated 89 and 90. The purpose of this card is just a random axis memory for the temporary storage of the program. Additional busses are seen at 88 and supported by chips and are backed up by other chips 91 and 92.

Figure 3:
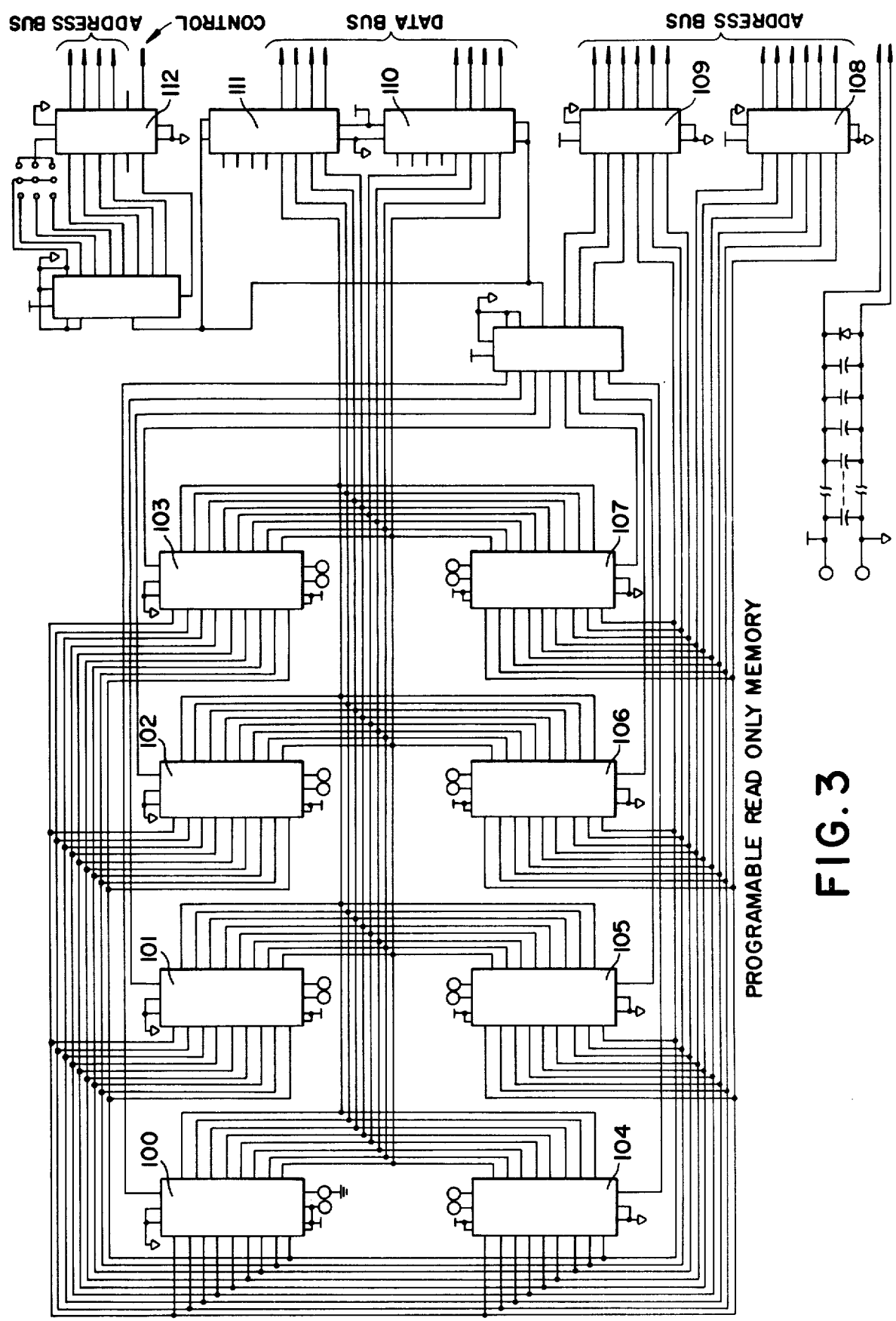
FIG. 3 is a schematic view of the PROM card with the programmable read-only memories.

FIG. 3 is a programmable read-only memory, as seen at 30 in FIG. 11. This carries the control sequences for the microprocessor, the program or the sequence of steps. The microprocessor tapes are stored on the PROM cards. As seen earlier, there are 16K of PROM and these are shown in eight 2K PROM chips, sequentially 100 through 107. The address and data busses on the right-hand side of the drawing are controlled by chips U-2 through U-6 and these are seen as 112 and 111 for the address and 111 and 110 for the data and 109 and 108 for the address busses. A voltage diagram is shown below for the 5-volt power supply.

Figure 4:
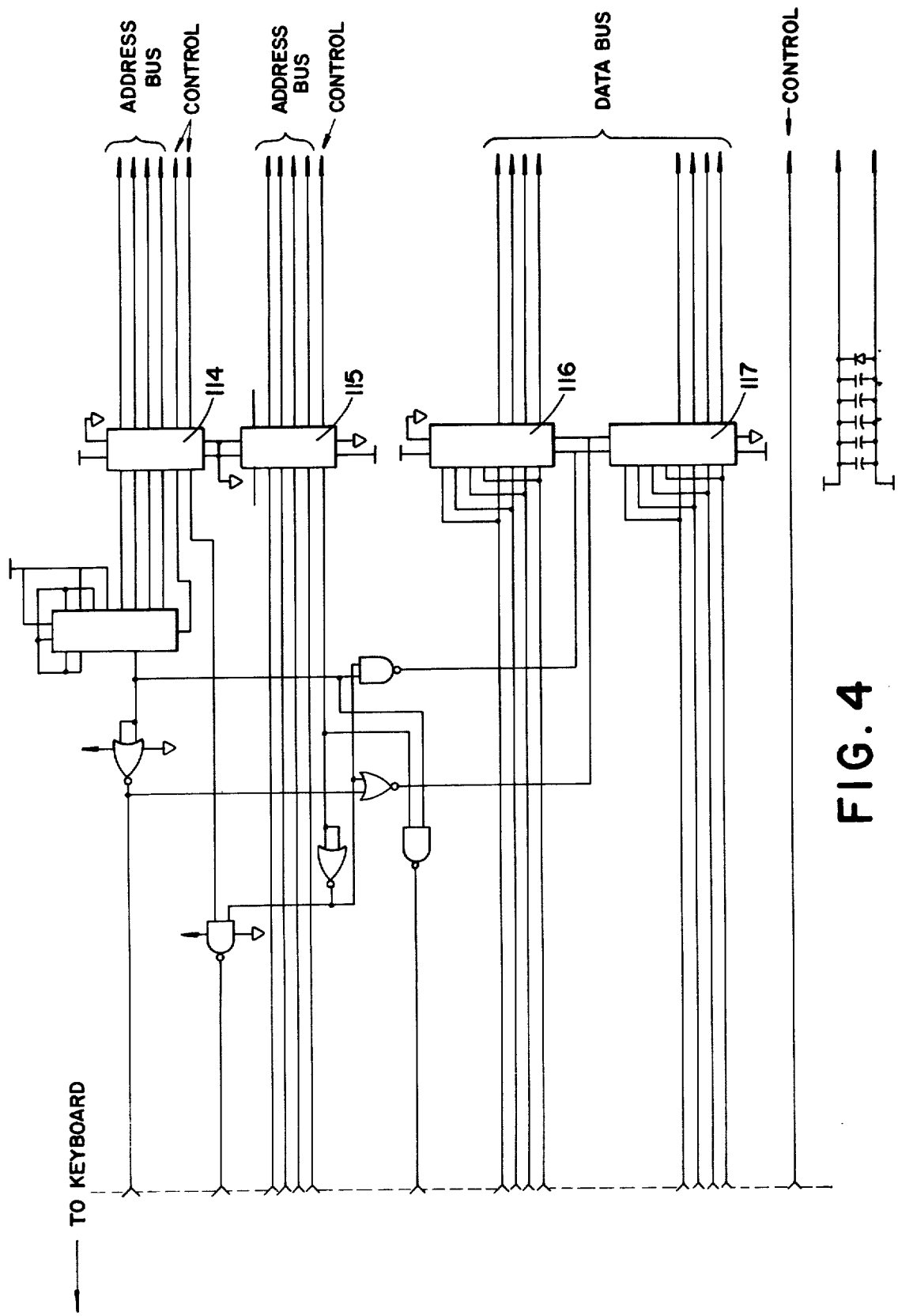
FIG. 4 is a schematic of the panel interface card.

FIG. 4 is a schematic of the panel interface. On the right-hand side of the page are the data address and control lines. These are controlled by chips 114 and 115 for the address bus and chips 116 and 117 are for the data bus connections. Both of these busses are buffered onto the keyboard. The panel interface board is in the rack and connected by a ribbon cable to the keyboard, which is on the front panel of the machine.

Figure 5B:
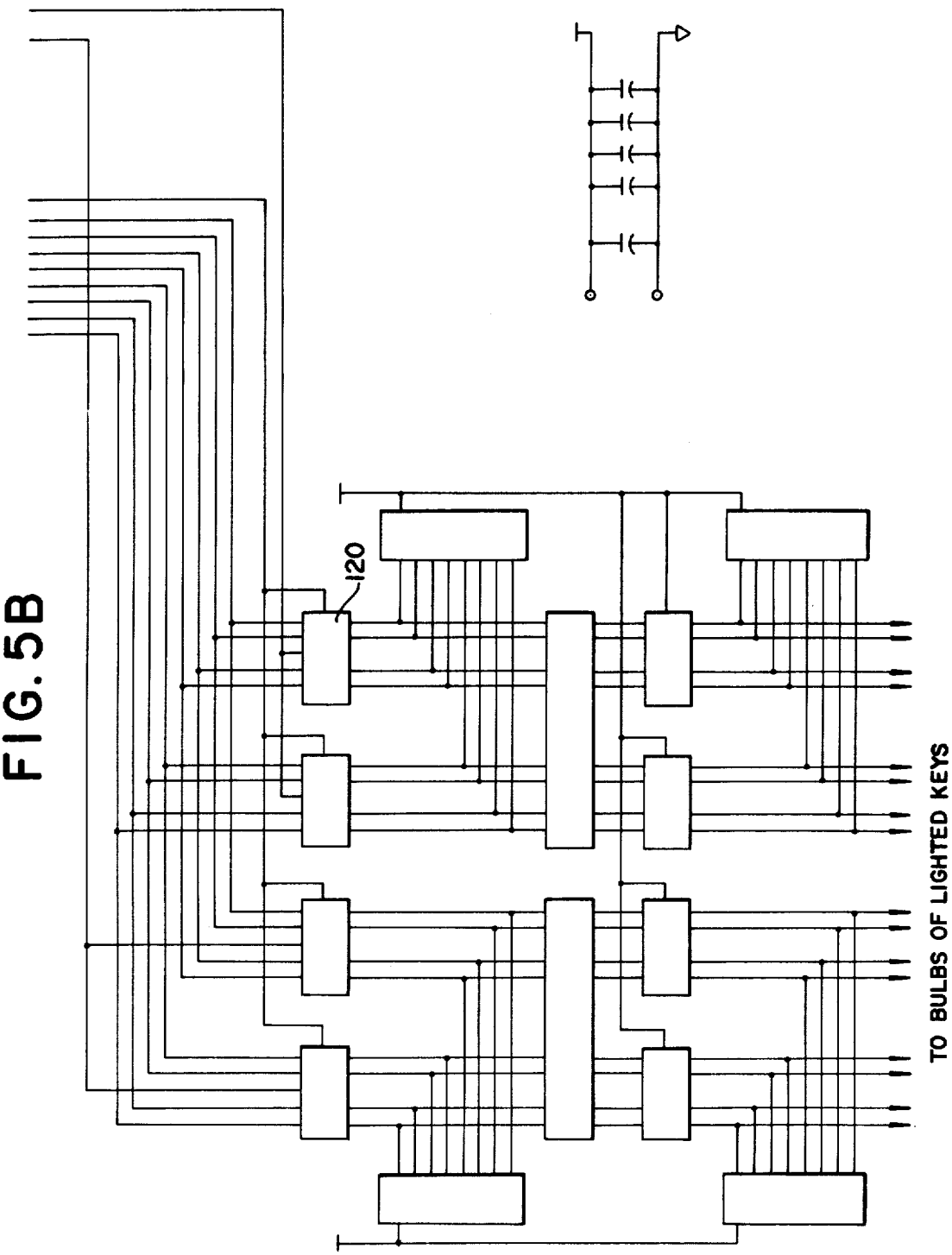
FIG. 5B is immediately below and connected to FIG. 5A and is a schematic showing the lamp drivers for the lighted key push switches.

FIGS. 5A and 5B are a pair of schematics that are directly one over the other. This chipboard is on the front panel of the control and contains all of the push buttons for the machine. The keyboard matrix is seen at 119 in FIG. 5A and has all of the contacts of all of the switches on the keyboard. Chip 121 controls this keyboard. The connections to the left are to the panel interface and those to the right of FIG. 5A are to the display boards. In FIG. 5A, chips 122 and 123 control these lines to the display boards. FIG. 5B shows the driver units, one of which is at 120 and these drive the lighted keys, that is, the functional keys.

FIG. 6 is a schematic of the LED display. These are indicated generally at 54 in FIG. 12 and there are three positions: D-1, D-2 and D-3 which are designated 129, 130 and 131 here. Each of the displays, an example of which is shown at 125, is controlled by a chip. The decoders are shown at 126 and the display latch is at 127. Data connections are shown generally at 128. A voltage diagram is shown on the bottom.

Figure 7:
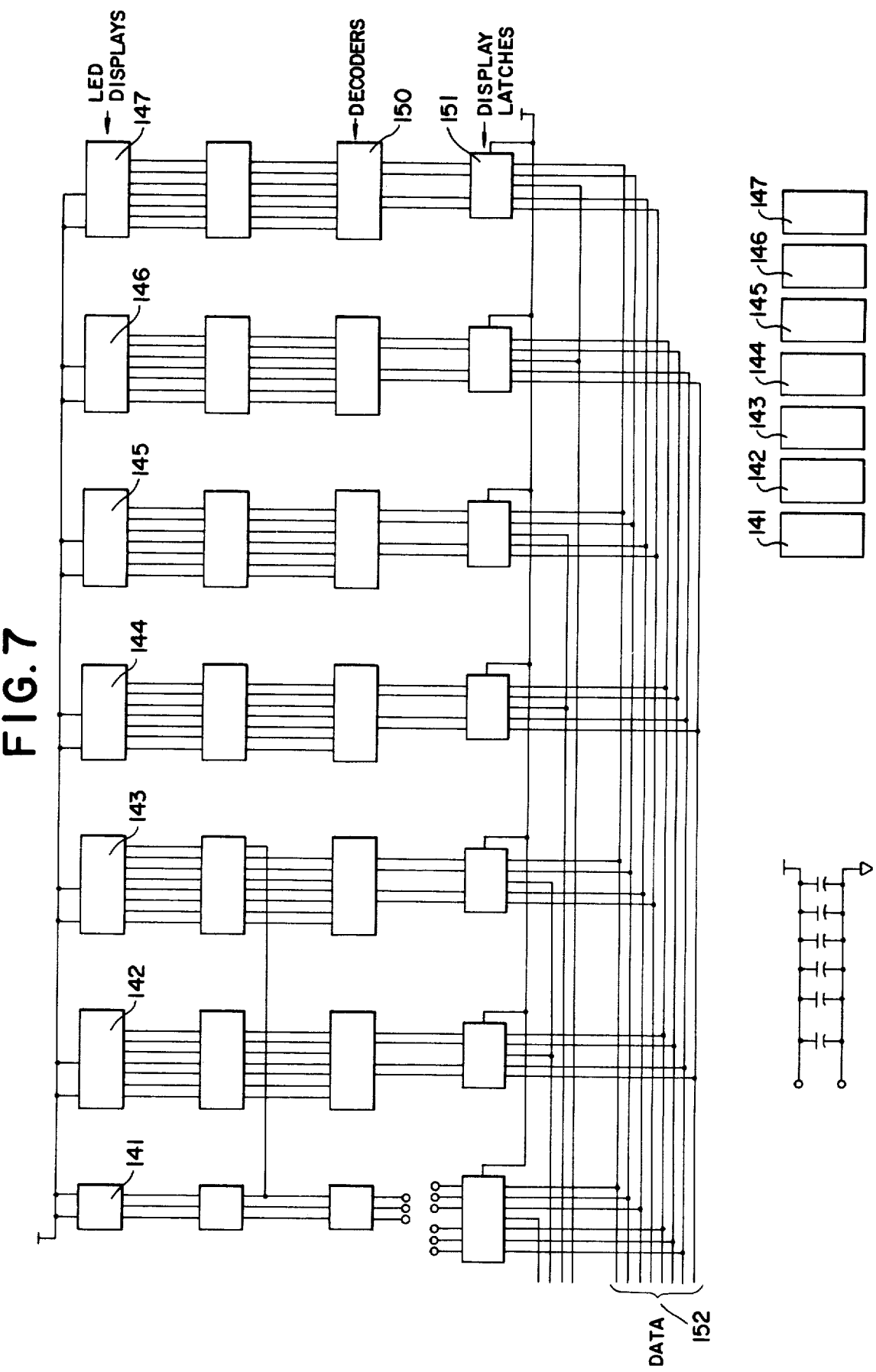
FIG. 7 shows the read outs for the X and Y units.

FIG. 7 is a schematic showing the read out for the X and Y units. Each of the seven positions of the read out are shown at 141 through 147 consecutively, and similar numbers are used for the basic diagram showing the chip that controls the display. Each of these are similarly numbered. Backing these up are decoders, one of which is shown at 150 and the display latches, another of which is shown at 151. The data lines are shown at 152. The voltage diagram is shown at the bottom. This is 5 volts. In this operation, the display latches which are controlled by the microprocessor and decoders which decode the binary information or BCD information into the seven segments of the display, are used to light up the display. There are, of course, two of these—one for X and one for Y.

Figure 8:
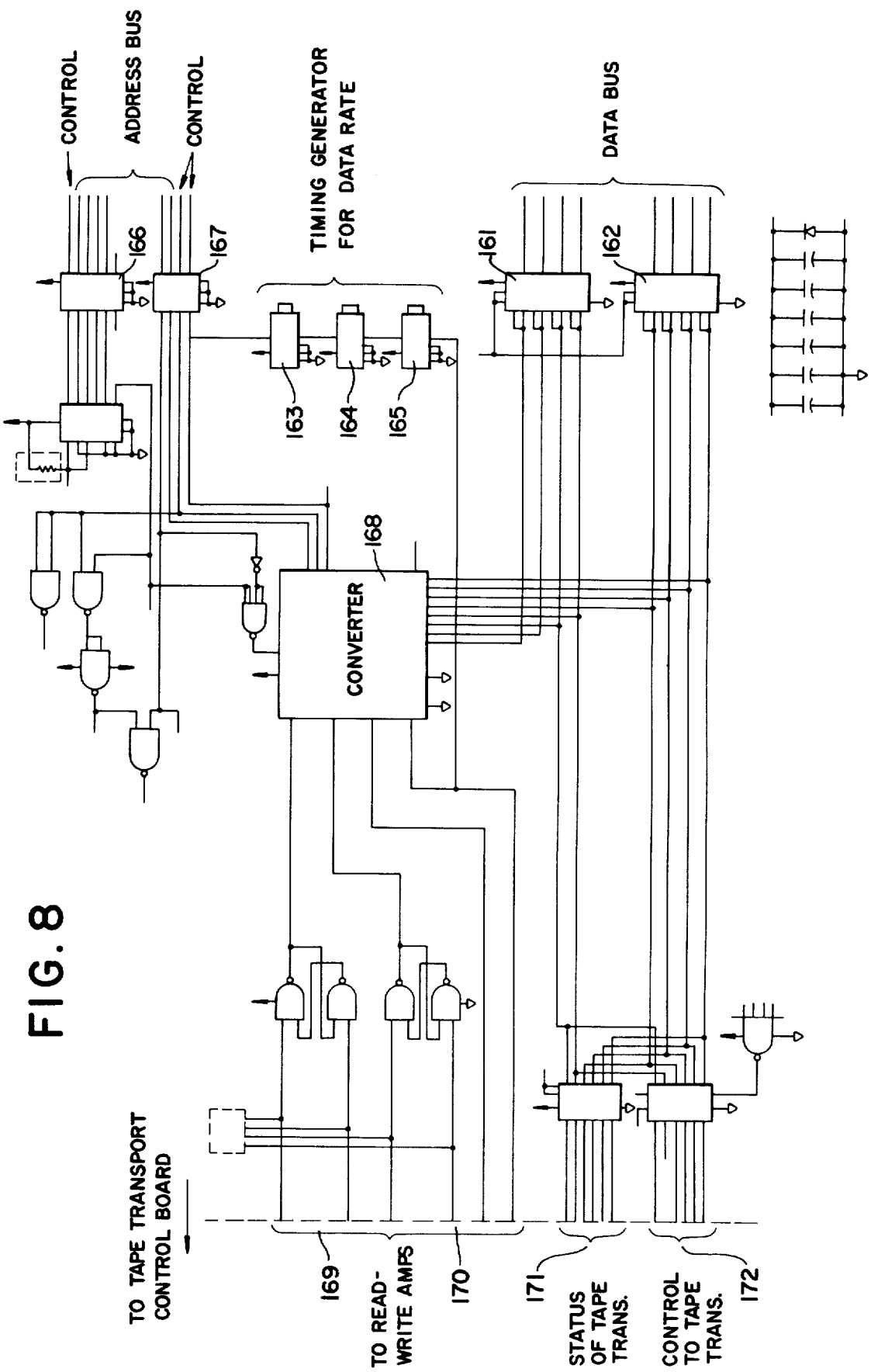
FIG. 8 shows the tape transport interface card from the microprocessor to the tape transport control board.

FIG. 8 is a schematic of the tape transport interface from the microprocessor to the tape transport control board. On the right are the chips and the connections to the address busses which are controlled by chips 166 and 167. Timing generators are shown at 163, 164 and 165 and the data bus chips and their connections are shown at 161 and 162. On the left are the connections to the tape transport control board, as seen at 169 and to the read/write amplifiers as seen at 170. Two other chips control the lines to the tape transport as seen at 171 and control the tape transport as seen at 172. The main chip on this schematic is the parallel to a serial converter which is indicated at 168. This takes the 8-bit parallel from the microprocessor and converts it into a serial data stream which is then written onto the magnetic tape. A reverse process takes place upon playback from the magnetic tape. The serial data stream is converted into parallel characters and unloaded back into the microprocessor. For further explanation, we might add that the control board contains the control amplifiers for the serial motors on the tape transports and also the logic that goes to the read/write amplifiers. The control and status to the tape transport control board is passed through this connector. The two tracks of information are recorded on the magnetic tape. One track contains data and the other track contains timing information. This allows for accurate reproduction of the data even through there may be variance in the tape speed. Timing information is passed back on playback from the data so that any tape speed is cancelled out.

Figure 9:
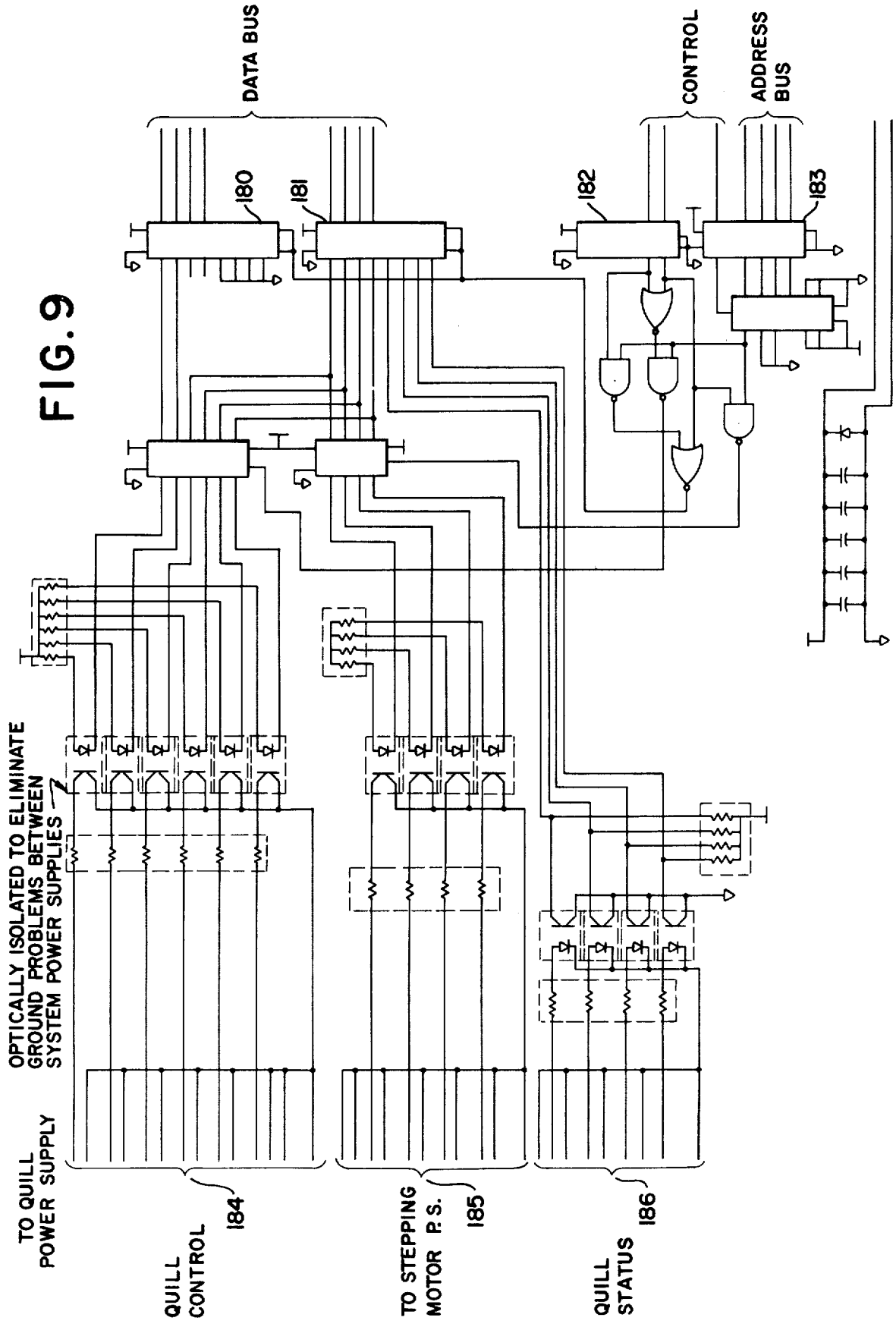
FIG. 9 shows the quill interface, the translator module and the quill control.

FIG. 9 is a schematic of the quill interface. The data bus on the right is controlled by chips 180 and 181. The address busses are controlled by chips 182 and 183. The quill power supply connected is off to the left as shown at 184. Both quill control and quill status are passed to the quill power supply and signals to the stepping motor supplies are also passed through this connector. Signals to the quill power supply into the stepping motor supplies are optically isolated to eliminate ground problems between the power supplies. This guarantees the ground loops and complete independence between logic and other system power supplies. The quill control lines would be the lines to the spindle quill. These control to the drill mill hex cycles of the spindle quill. The status 186 back from the spindle quill indicates either pull is completely down, pull is completely up or the operation is in progress. The lines to the stepping motor 185 indicate either clockwise or counterclockwise rotation for either the X or Y motors.

Figure 10:
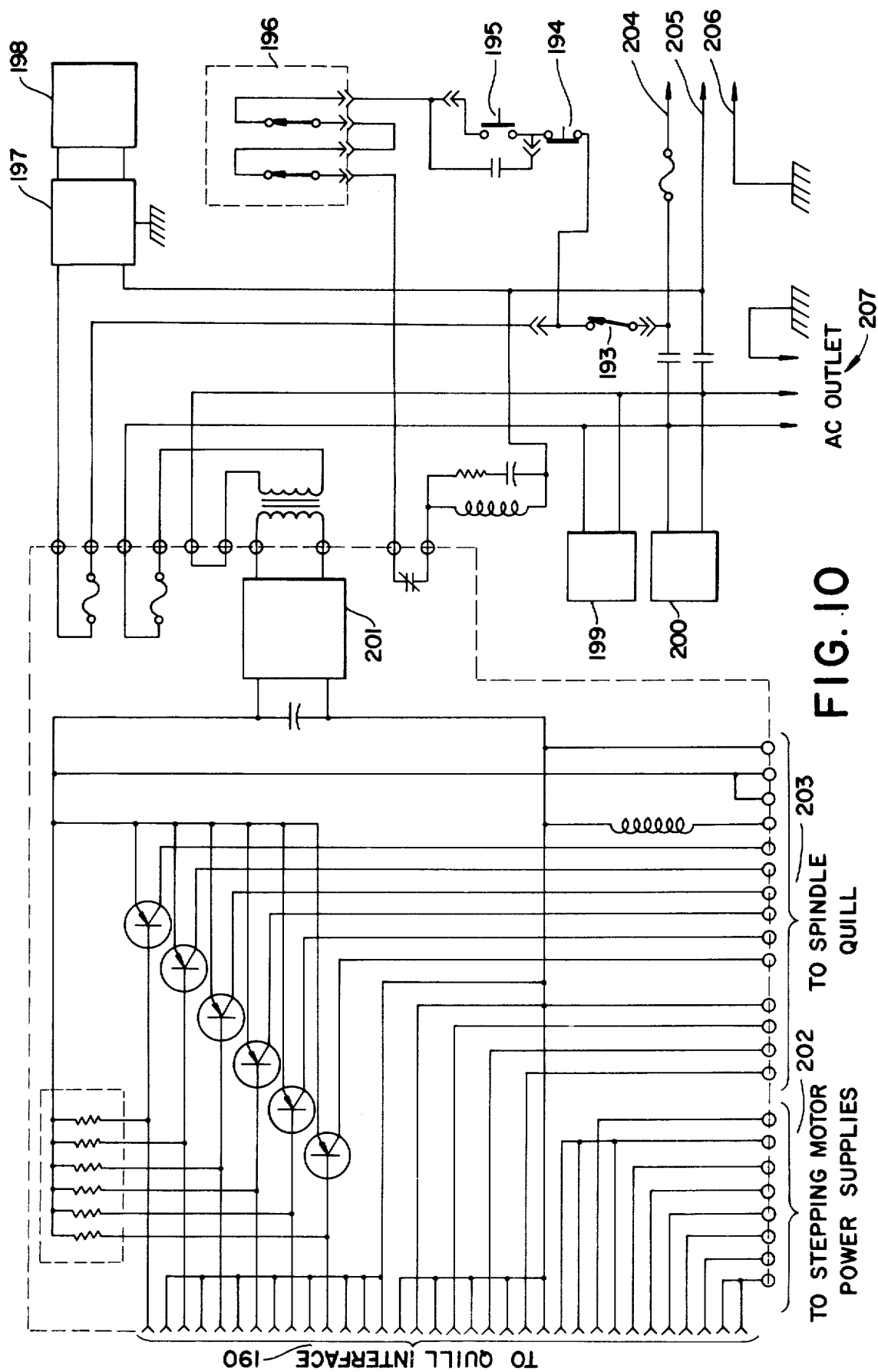
FIG. 10 shows the quill power supply.

FIG. 10 shows the power wiring for the quill power supply. To the left are the connections to the quill interface at 190. There is, of course, shown a full wave bridge rectifier 201, and the various power supplies for portions of the circuits as well as the filters. This spindle quill power supply contains a 24-volt power supply needed to drive the electronics of the spindle quill. The emergency stop 194 on the spindle quill is connected into the AC electrical wiring of the control CR2 at 192. The AC electrical wiring is also shown in this schematic. It shows the X and Y power supplies for the stepping motors, the logic power supplies, the run and the emergency stop buttons on the front panel, and the power contactor which controls the heavy AC wiring CR1, indicated at 193.

Optional units which are shown on this schematic limit the travels of the bed of the milling machine. Also enclosed with this diagram are the schematic and the stepping motor power supplies for the various controls: the power on, which is indicated at 191; the emergency stop at 194; the permit run at 195; the optional limit switches at 196; the RF filter at 197; and the logic power supply PS1, which is shown at 198. The X power supply PS2 is shown at 199 and the Y power supply PS3 is shown at 200. The full wave bridge rectifier is seen as at 201. The connections to the stepping motor power supplies are seen at 202 and those to the spindle quill are seen generally at 203. The 117-volt AC line is indicated at 204, the neutral at 205 and the ground line at 206. The AC outlet is generally seen at 207.

OPERATION

Briefly the operation of the control is as follows:
Power Up:

On power-up or after a "SYS CLR" the program memory will be cleared (all locations are zeros). The machine will go into the program mode and the "PROG" light will light. The program memory can not be loaded from tape or from the keyboard.

Programming from tape:

Load the cassette with the program desired in the tape transport. Push the "PLAY BACK" button. The "PLAY BACK" light will light and the tape will begin reading, programming the memory. At the end of the program the tape will rewind.

An error during a read will cause the tape to rewind and the position read-out to flash an error code. The "RESET" button will reset the error condition and allow the operator to try to re-read that tape or back-up tape.

Programming from keyboard:

The first data entered from keyboard will be the X coordinate. The numbers entered will be in centimeters if in the metric mode and in inches if not in metric mode. (The controller is in metric mode when the "METRIC" light is lit.) The digits entered will appear in the X readout. When the number displayed is correct, press the "ENTER" button. This will load the X coordinate into memory and round the display to the nearest incremental step of the milling machine.

If a mistake is made while entering data, the "CLR ENTRY" button will clear the display and allow the data to be entered again.

After the X coordinate is entered, the Y coordinate is entered in the same manner as the X coordinate. The tool number and spindle operation can be entered after both the X and Y coordinates have been entered. To enter either a tool number or spindle operation, first press the "TOOL NO." button. The "TOOL NO." light will light indicating the controller is ready for data. The first number entered should be the actual turret stop number desired (1-12), followed by a decimal point and the code for the spindle operation desired (Table 1).

| CODE | OPERATION |
|------|-----------|
| 0 | Tool up - Spindle on |
| 1 | Drill |
| 2 | Peck |
| 3 | Mill |
| 4 | Tool up - Spindle off |
| 5 | Auxiliary on |
| 6 | Auxiliary off |
| 7 | Programmed pause |

TABLE 1. SPINDLE OPERATION PROGRAM CODES

If the tool is up and a turret stop change is not required, it is not necessary to make an entry.

The feed rate is entered next. Push the "FEED RATE" button and the "FEED RATE" light will light. The feed rate will be in centimeters/min. if in metric mode and inches/min. if not in metric mode. When the feed rate is entered, the feed rate will be rounded to the nearest feed rate available.

If a feed rate is not entered, then the standard speed for the operation is used. (1"/min. for milling and 80"/min. for free travel.)

The "SING STEP" button increments the position number. The next point is programmed in the same manner.

When setting up the program sequence the first point becomes the "home" position. In the run auto mode, the milling machine will pause each time it is at the "home" position. Tool changes can be easily handled by programming a "home" position when a tool change is required. If it is desired to have the milling machine pause at some location other than the home location, a sequence step can be programmed with the spindle operation being a "Programmed Pause." (Code 7) The last point programmed should be "home" position to have the milling machine positioned to begin the next run.

List Mode:

By pushing the "LIST" button the controller will go from program mode to the list mode. In "LIST" mode the program in memory can be examined but cannot be changed. The "SING STEP" button will step through the program. The "TOOL NO." or the "FEED RATE" can be displayed by pressing the "TOOL NO." button or the "FEED RATE" button respectively.

To look at a particular position, the sequence number can be entered by pressing the "SEQ." button, entering the position number and pressing "ENTER." That position will now be displayed.

To change the program, push the "PROG" button. The "LIST" light will go off and the program can now be changed. If the program is to be changed from a particular sequence number to the end of the program, follow the same procedure described in the "Programming from Keyboard" section. If only one particular sequence number is to be changed, enter the X and Y coordinates, Tool Number, and Feed Rate and then do not press the "SING STEP" button but press the "LIST" button returning to the list mode. This will not change the remaining program.

Saving the program on tape:

The program can be saved on tape by placing a cassette in the tape transport and pressing "REC" while in the program mode. The memory will be written on tape. The tape can be verified by pushing the verify button. The "VER" light will light and the tape will begin reading. The program read from the tape is compared with the program in memory. If a mismatch is found, the tape will rewind, and the position readout will flash an error code. The "Reset" button will reset the error condition and allow the operation to re-program the tape.

Programming a circular arc:

Circular interpolation is accomplished by programming the starting point, the direction of travel about the center, the center of the radius, and the end point. The starting point is programmed in the normal manner. The center of the radius is programmed in the following manner: Before entering the X coordinate, push either the CW or CCW (clockwise/counterclockwise) button giving the direction of travel around the center. Next, enter the X coordinate and the Y coordinate of the center of the radius. The Tool No. and Feed Rate are ignored. The next sequence number gives the end point of the arc. The end point of one arc can be the beginning of another arc. This allows programming of complex curves by progra-ming consecutive circular arcs.

Run Mode:

After the program has been loaded, the controller is ready to go into the Run Mode. The Run Mode can be entered at any position number so that the program can be started anywhere in the program. Under normal operation the machine enters Run Mode at position 1.

The controller has to have the milling machine manually positioned to the "home" position. (The "home" position is the point at Seq. 1). To position the milling machine, press "Run" and then the jog button to move the bed. (Only one jog button should be pressed at a time). A momentary push on the jog button will cause the bed to move 1 step. (0.0005") If the button is held for 1 second the bed will begin accelerating to a high speed travel. When the buttom is released the bed will decelerate until it stops.

Semi-Auto/Auto Operation

After the bed has been positioned to home position, the program is ready to run. There are two modes of operation in "RUN," semi-auto and auto. In semi-auto operation the machine will run automatically from one point to the next. At each point the "PAUSE" light will come on and the machine will stop before doing the quill operation. The "PAUSE" button must be pushed before the machine will continue. In auto operation the machine will run from point to point only stopping if the point programmed is at home position, or if the quill operation is a pause (7). This will allow the operator to change tools or remove the piece. The last point programmed should be home position so that the machine will be positioned for the next run.

The machine can be stopped anywhere by pushing the "PAUSE" button. This will light the "PAUSE" light and stop the bed. The machine will continue when the pause button is pushed again.

The "PAUSE" button is the only button active when the machine is running. No other buttons will have any effect with the exception of "SYS CLR." The "SYS CLR" button has the same result as a power-up. The machine will stop and the memory will be cleared.

The "EMERGENCY STOP" button will turn off the power to the stepping motors and to the spindle. The memory will not be lost when the "EMERGENCY STOP" switch is used but the controller will not be able to continue without repositioning the bed to a known position.

The invention has been described in great detail sufficient to enable one of ordinary skill in the art to make and use the same. Obviously, modifications and alterations of the preferred embodiment will occur to others upon a reading and understanding of the specification and it is our intention to include all such modifications and alterations as part of our invention insofar as they come within the scope of the appended claims.

| LIST OF INTEGRATED CIRCUITS USED IN CONNECTION WITH THE MACHINE | |
|---|---|
| u1, u2, u12 | - 8T98 |
| u3, u4, u5 | - 74LS293 |
| u6, u7 | - 8T26 |
| u8 | - 74LS85 |
| u10 | - M6852P |
| u11, u9 | - 74LS00 |
| u6 | - 74LS04 |
| u13 | - 74LS174 |
| u14 | - 74LS20 |
| u15 | - 4306R-101-102 |
| u1, u2 | - 8T26 |
| u3, u4 | - 8T98 |
| u5 | - 74LS85 |
| u6, u7 | - 74LS174 |
| u8 | - 74LS02 |
| u9 | - 74LS00 |
| u10 thru u23 | - 4N36 - G.E. or Optron |
| u24 | - 4114R-002-561 |
| u25 | - 4306R-101-472 |
| u27 | - 4114R-001-472 |

LIST OF INTEGRATED CIRCUITS USED IN CONNECTION WITH THE MACHINE

| | |
|---|---|
| u26 | - 4308R-102-220 |
| u28 | - 4308R-102-472 |
| u1 | - 74LS156 |
| u2 | - 4116-002-472 |
| u3 | - 74LS154 |
| u4 thru u7 | - 74LS175 |
| u8, u9 | - 4310-101-562 |
| u10, u11 | - 4116-001-241 |
| u12 thru u15 | - 2905 |
| u3 | - 8T26 |
| u4 | - 8T26 |
| u5 | - 8T98 |
| u6 | - 8T98 |
| u7 | - 74LS138 |
| u8 thru u15 | - HM-7641-5 (Production Model) |
| u1 | - MC6800-P |
| u2 | - MC6870 |
| u3 | - MC6810P1 or MC6810AP, MC681AP1 |
| u4 | - MCM6810P1 |
| u5, u6 | - HM-7461-5 (Production Model) |
| u7, u8, u9 | - 8T98 |
| u10, u11 | - 8T26 |
| u12 | - 8T98 |
| u13, u14 | - 74LS02 |
| u15, u16 | - 74LS00 |
| u17 | - 4116R-002-562 |
| u18 | - NeS55 |
| u18 | - NE5SS |
| u3, u4 | - 8T26 |
| u5, u6 | - 8T98 |
| u7 | - 74LS138 |
| u8 thru u15 | - HM-7641-5 (Production Model) |
| u1 | - MC6800-P |
| u2 | - MC6870 |
| u3 | - MCM6810 or MCM6810AP, MCM6810AP1 |
| u4 | - MCM6810P1 |
| u5, u6 | - HM-7641-5 (Production Model) |
| u7, u8, u9 | - 8T98 |
| u10, u11 | - 8T26 |
| u12 | - 8T98 |
| u13, u14 | - 74LS02 |
| u15, u16 | - 74LS00 |
| u17 | - 4116R-002-562 |
| u18 | - NES55 |
| u18 | - NE5SS |
| u1 thru u3 | - 7447 |
| u4 | - 74LS174 |
| u5, u6 | - 74LS175 |
| u1 | - 7416 |
| u2 thru u7 | - 7447 |
| u8 | - 74LS174 |
| u9 thru u14 | - 74LS175 |
| u1 | - 74LS156 |
| u2 | - 4116-002-472 |
| u3 | - 74LS154 |
| u4 thru u7 | - 74LS175 |
| u1 | - MC6800-P |
| u2 | - MC6870 |
| u3 | - MCM6810 or MCM6810AP, MCM6810AP1 |
| u4 | - MCM6810P1 |
| u5, u6 | - HM-7641-5 (Production Model) |
| u7, u8, u9 | - 8T98 |
| u10, u11 | - 8T26 |
| u12 | - 8T98 |
| u13, u14 | - 74LS02 |
| u15, u16 | - 74LS00 |
| u17 | - 4116R-002-562 |
| u18 | - NES55 |
| u18 | - NE5SS |
| u1 thru u3 | - 7447 |
| u4 | - 74LS174 |
| u5, u6 | - 74LS175 |
| u1 | - 7416 |
| u2 thru u7 | - 7447 |
| u8 | - 74LS174 |
| u9 thru u14 | - 74LS175 |
| u1 | - 74LS156 |
| u2 | - 4116-002-472 |
| u3 | - 74LS154 |
| u4 thru u7 | - 74LS175 |
| u8, u9 | - 4310-101-562 |
| u10, u11 | - 4116-001-241 |
| u12 thru u15 | - 2905 |
| u16, u17 | - 4310R-101-XX1 |

What is claimed is:

1. In a computer numerical control for point-to-point positioning and programming of a machine tool on at least two axes, said control being physically adjacent and electrically connected to the machine tool and having programming and control functions for said machine tool, said control comprising:
   (a) an input terminal having a keyboard with alphanumeric input plus functional control keys;
   (b) disply means for showing the position of the machine tool at any time in X and Y coordinates, and having a display means which may be selectively used to output position number, tool number, and feed rate information;
   (c) a microprocessor having an arithmetic logic unit, a CPU, RAM and ROM store and data and address handling means;
   (d) a cassette tape input means with control logic therefor to input a computer program into store and to tape a program in store; and
   (e) control means including functional keys for causing the stored program to direct and control the machine tool together with other control means for inputting into store, machine language instructions directly on the terminal, thereby modifying a stored program or building one.

2. The computer numerical control of claim 1 in which the entire program is entered into store directly on the control through the terminal and checked on the display for X and Y positions as the steps of the program are performed.

3. The computer numerical control of claim 1 in which a number of offsets are programmed into the program and the machine tool is run with those offsets and stored on tape for reuse.

4. The computer numerical control of claim 1 in which the program has stored coordinates, i.e., X and Y, plus speed of travel for a machine operation and a control program in the machine regulates the acceleration and deceleration of the drive depending on the inertia of the machine, distance to travel and other factors and provides direct control to the machine without other interface equipment.

5. The computer numerical control of claim 1 in which the coordinates of any number of steps can be recalled for use in a subsequent programming step with another tool without reprogramming the coordinates of the new positions.

6. In a computer numerical control for point-to-point positioning of a machine tool on at least two axes comprising:
   (a) an input terminal having a keyboard with alphanumeric input plus functional keys:
   (b) display means for showing the position of the machine tool at any time in X and Y coordinates, and having a display means which may be selectively used to output position number, tool number, and feed rate information;
   (c) cassette tape input means;

(d) a microprocessor having an arithmetic logic unit, a CPU, RAM and ROM, and data and address handling means;

(e) means for controlling the microprocessor through the keyboard to input to RAM, X and Y coordinates of positions for machining in addition to speed of travel between positions;

(f) means for converting the input data from English or metric units to machine language for storage in direct control of the X and Y axes of the machine tool; and (g) means for reconverting the machine language store to English or metric units for program checking or control.

7. The computer numerical control of claim 6, in which the entire program is entered into the control in either English or metric units, converted to machine language for controlling the machine tool and then retrieved for display on command in either unit by reconversion.

8. In a computer numerical control for point-to-point positioning of a machine tool on at least two axes, a circular interpolation means comprising:

(a) an input terminal having a keyboard with alphanumeric input plus functional keys;

(b) display means for both X and Y axes;

(c) cassette tape input means;

(d) microprocessor having an arithmetic logic unit, a CPU, RAM and ROM, and data and address handling means;

(e) means for controlling the microprocessor through the keyboard to input to RAM, X and Y coordinates of positions for machining in addition to speed of travel between positions;

(f) means for storing coordinates of a circular interpolation routine in the form of
  (1) a starting coordinate in X and Y data,
  (2) center coordinates in X and Y data,
  (3) end point coordinates in X and Y data,
  (4) clockwise or counterclockwise movement;

(g) means for calculating the position of the circular interpolation over an infinite number of discrete points without regard to quadrants;

(h) calculating means to locate the tool at these discrete points; and (j) comparison means to compare the calculated position with the actual position to guide the machine tool in a continuous path radius compensation.

* * * * *